Sept. 14, 1943.   G. S. LEWIS   2,329,547
LEAFED DEVICE
Filed April 7, 1943   2 Sheets-Sheet 1
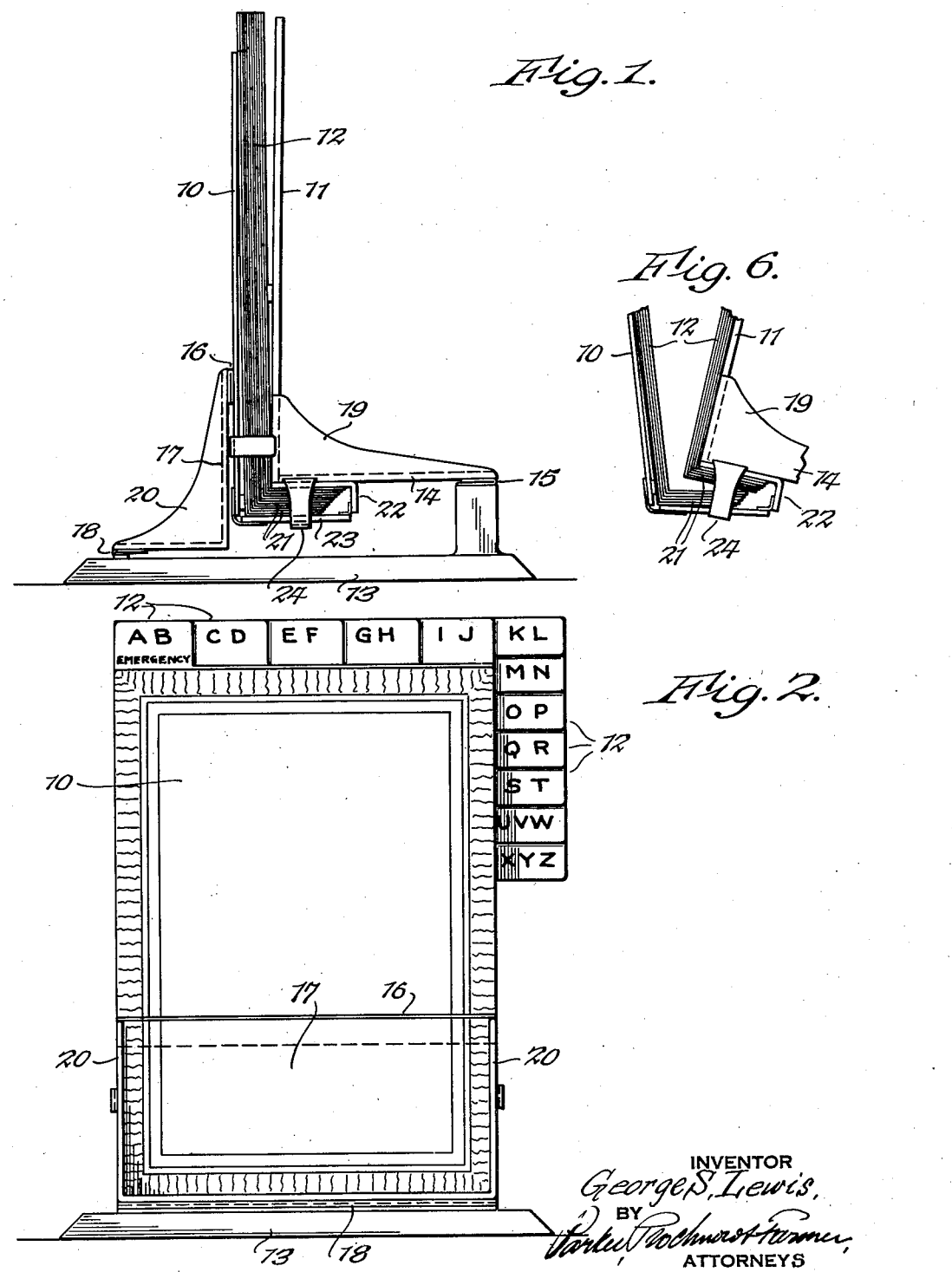

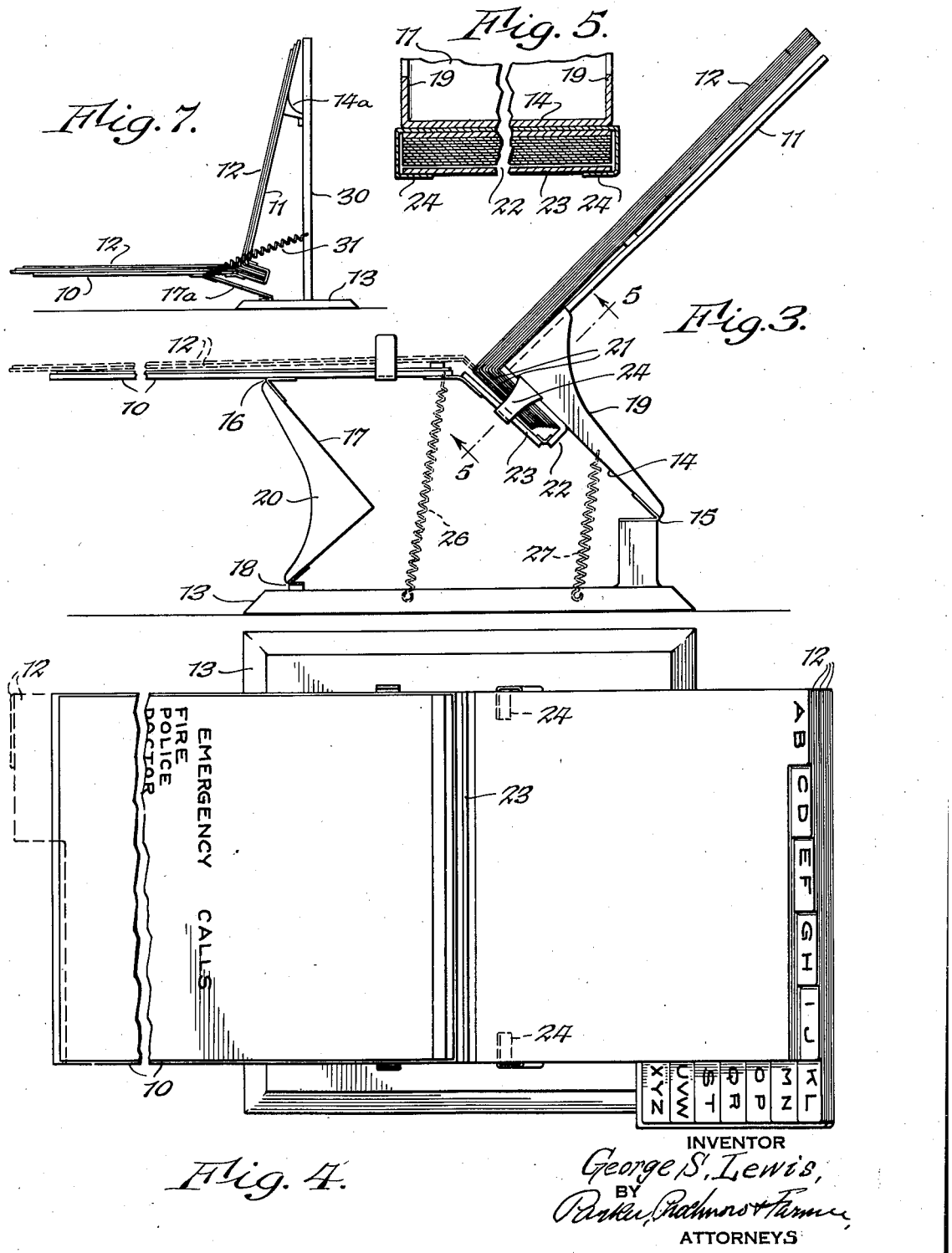

Patented Sept. 14, 1943

2,329,547

UNITED STATES PATENT OFFICE 2,329,547

LEAFED DEVICE

George S. Lewis, Buffalo, N. Y.

Application April 7, 1943, Serial No. 482,122

12 Claims. (Cl. 129—16)

This invention relates to improvements in leafed devices, such for instance as indexes, etc., which comprise a book or group of leaves or pages bearing lists or other data, and means for readily opening the same at any selected leaf and closing the leaves.

One object of the invention is to provide a desirable and convenient device of this nature which can be quickly and easily manipulated to open the leaves to expose to view any desired leaves, and which preferably operates automatically to close the leaves.

Other objects are to provide a practical and desirable device of the sort mentioned which is of simple and inexpensive construction; which comprises a book or group of indexed leaves that normally remain closed in a standing or upright position but can be readily opened to a selected leaf by pressure of a finger on the index portion of such leaf, and which will automatically return to the closed upright position when the pressure on the leaf is released; which comprises loose leaves that are removably retained in place so that any one or more of the leaves can be readily removed and replaced, or different leaves substituted therefor, or the number of the leaves enlarged or reduced; which comprises leaves hinged to hinge flaps and confined between covers by a holding means in such a manner that the leaves are loosely or shiftably confined so as to facilitate the operation of the device and insure the free swinging of the leaves in opening and closing them.

Further objects and advantages of the invention will appear from the following specification of the preferred embodiments of the invention, shown in the accompanying drawings, and the novel features of the invention are set forth in the appended claims.

In said drawings:

Fig. 1 is a side elevation of the device showing the leaves in the normal upright or standing closed position.

Fig. 2 is a front elevation thereof.

Fig. 3 is a side elevation thereof showing the position of the parts when the device is opened to expose a selected leaf.

Fig. 4 is a plan view of the device when opened, as shown in Fig. 3.

Fig. 5 is a transverse section of the device on line 5—5, Fig. 3.

Fig. 6 is a schematic view illustrating the action of the leaf holder when opening the book.

Fig. 7 is a side view, similar to Fig. 3, of a somewhat modified construction embodying my invention.

Referring first to the embodiment of the invention shown in Figs. 1–5, the device comprises a book, stack or group of leaves including front and rear covers, or outside leaves 10 and 11, and one or more inner leaves 12 between said covers, mounted on a base 13 to normally occupy a standing or upright position as shown in Fig. 1.

The outside leaves or covers 10 and 11 may be made of pieces of relatively stiff paperboard, fiberboard or other suitable material. A supporting or rocker member 14 suitably fixed to and projecting rearwardly from the back cover 11 is arranged to pivot or rock, as by a hinge 15 at its rear end, preferably on a raised part or block of the base 13 so that the back cover 11 can swing forwardly and rearwardly about the hinge connection or pivot bearing of the member 14 on the base. The other or front cover 10 is hingedly connected at its lower end with the back cover, preferably as later explained, and said front cover 10 is hinged between its upper and lower ends, at 16, to a fulcrum member 17 which is hinged at its lower end, at 18, to the base 13, at a point spaced or removed forwardly from the plane of the front cover when it is in its upright position.

The supporting or rocker member 14 and fulcrum member 17 may be of any suitable form or construction. As shown, the supporting member is formed by the transverse piece 14, of suitable flat material, such as used for the covers, which projects out at an angle from the back cover, and triangular side pieces 19 secured to the side edges of the piece 14 and of the back cover, thus securely fastening the supporting member to and holding it rigid with the cover. The fulcrum member 17 shown, consists of a right-angle-shaped piece of fiberboard or other suitable material, stiffened and strengthened by triangular side pieces 20 secured to the side edges of the angle-shaped piece 17. The hinges 15, 16 and 18 for these members may be of any suitable construction, such for instance, as flexible strips cemented to the parts which they connect.

Each of the inner leaves 12 may be made of thin card stock and is preferably provided at its lower end with a hinge flap 21 hingedly connected to the leaf, as by a flexible hinge strip cemented to the adjacent margins of the leaf and flap. These inner leaves are retained in place between the front and rear covers 10 and 11, preferably by a suitable leaf holder or receptacle 22 connected with the lower end portion of the rear cover so as to swing with this cover. As shown, the receptacle is fixedly secured on the bottom of the supporting member 14, and in the normal position of the parts, lies horizontally below the member 14 with the open end of the receptacle facing toward the lower end of the front cover 10. The hinge flaps of the inner leaves extend into the receptacle through its open front end and the leaves extend upwardly from the front hinge edges of the hinge flaps between the front and rear covers. By thus arranging the receptacle horizontally instead of vertically, the height of the device is reduced. The bottom 23 of the leaf receptacle 22 may be hinged at its rear edge to the rear wall of the receptacle, as by a flexible hinge strip. Thereby, the bottom wall 23 is adapted to swing downwardly or away from the top of the receptacle to a limited extent, determined by suitable means, such as stop fingers 24 which extend down from the supporting member 14 and have lower ends projecting under the bottom of the receptacle. In this manner the leaves 12 are removably retained between the covers by confinement of the hinge flaps in the holding receptacle 22. The front edge of the receptacle bottom 23 is preferably hinged, as by a flexible hinge strip, to the lower end of the front cover 10, this hinge forming the hinge connection, before mentioned, between the lower ends of the front and back covers 10 and 11.

With the parts thus constructed and arranged, if the upper end of the back cover is swung rearwardly from its normal upright position, its supporting member 14 will swing upwardly and rearwardly about its hinge or pivot bearing on the base, and through the medium of the hinge connection between the lower ends of the front and back covers, the front cover will be swung forwardly and downwardly about its hinge connection with the fulcrum member 17, the latter swinging forwardly and upwardly about its hinge connection 18 with the base. The fulcrum member thus forms a movable fulcrum about which the front cover can swing forwardly and downwardly to the substantially horizontal position shown in Fig. 3. Consequently, if the upper end of a selected inner leaf is pressed rearwardly, this leaf and the leaves in back of the same, and the back cover will be swung or tilted backwardly, and the front cover will be swung forwardly as explained, so that the inner leaves in front of the selected leaf on which the pressure is exerted, will rest against and swing with the forwardly inclined and downwardly moving front cover. In this way the upright book or group of leaves can be readily opened at any desired page or leaf simply by pressing the upper edge of said page rearwardly, which will cause this leaf and those back of it to move backwardly while the leaves in front of the selected leaf will swing or open forwardly and downwardly with the front cover.

To facilitate this manipulation of the device, the several inner leaves are preferably provided with marginal indexed portions, as shown in Fig. 2, which portion for each leaf projects beyond the index portion for the next leaf in front thereof, so as to provide an exposed portion for each leaf which can be engaged by the finger for opening the leaves. As shown, the indexed portions for a part of the leaves are provided at the upper edges thereof while said portions for the remaining rearward leaves are provided at one side edge of the leaves. In this way, the device can be provided with a number of leaves and the index part of each leaf will have an exposed portion of substantial area for engagement by the finger for opening the leaves.

Preferably the rocker and fulcrum members 14 and 17 are so proportioned and positioned relatively to the base and covers with which they are connected that when the leafed book has been opened, as explained, and shown in Fig. 3, the weight of the parts will be distributed on the fulcrum and rocker members so that when the rearwardly tilted back cover and leaves are released, or the finger pressure removed therefrom, the unbalanced weight of the lower inner portions of the book will overbalance the outer portions thereof and automatically return the parts to normal position and close the leaves or book in the upright position shown in Fig. 1. Thus, the user only has to press rearwardly the upper end of the selected leaf to open the book at the desired leaf or page, and when the opening pressure is removed, the book will automatically close. This closing action can be made more positive or rapid by the use of one or more springs, such for instance, as the light coil springs 26 and 27 shown in Fig. 3 as attached to the base 13 and respectively to the lower end of the front cover and to the member 14. Such springs, however, are not essential to the described automatic closing of the book and can be omitted. Also, if desired, one or more of the parts could be appropriately weighted to increase or accelerate the closing action of the device.

Since, as explained, the leaves 12 are removably retained in place by their hinge flaps seated in the holding receptacle 22, the leaves can be readily removed when the book is open. This permits easy removal and replacement of any leaf or leaves if desired for any reason, or the substitution of different leaves for any of those in the book, and a ready increase or decrease in the number of leaves. By the described hinging of the bottom 23 of the holding receptacle 22, it can drop against its stops during the initial opening movement of the book, thereby permitting the leaves in front of that leaf on which the opening pressure is applied to drop slightly away from the restrained back leaves, as indicated diagrammatically in Fig. 6, and thereby ensure a more certain swinging or opening of the unrestrained leaves with the forwardly swinging front cover.

While, as above described, the book is opened by rearward movement of the selected leaf and back cover, obviously it can be opened by forward movement of the front cover and leaves in front of a selected leaf, and the marginal index portions of the leaves, if desired, can be reversed to facilitate such operation of the device.

The modified construction shown in Fig. 7 differs from the construction of the other figures chiefly in that the rocker or supporting member 14a on the back cover 11 is located nearer the upper or outer end of the cover and bears and pivots on a shoulder on a fixed upright support 30 rising from the base 13. In this modification the book is opened by pressing rearwardly on the selected leaf at its upper portion above the rocker member 14a, which will swing the front cover forwardly and downwardly about its hinge connection with the fulcrum member 17a and cause the leaves 12 in front of the selected one to swing open with the front cover. When the pressure is released, the book will be closed by a suitable spring 31 which may be attached to the front cover and to the support 30.

I claim as my invention:

1. A leafed device of the character described comprising a base, a pair of covers which normally stand facing each other over said base and are hingedly connected at their lower ends, a supporting member projecting from one cover and fulcrumed on the base outwardly away from the plane of the cover to adapt said cover to swing to and from its standing position, a fulcrum member hinged to the other cover between the upper and lower ends thereof and hinged to the base outwardly away from the cover whereby swinging movement of one cover will cause opposite swinging movement of the other cover, and inner leaves confined between said covers and arranged at their lower ends to swing relatively to each other and to the covers.

2. A leafed device of the character described comprising a base, a pair of covers which normally stand facing each other over said base and are hingedly connected at their lower ends, a supporting member projecting from one cover and hinged to the base outwardly away from the plane of the cover to adapt said cover to swing to and from its standing position, a fulcrum member hinged to the other cover between the upper and lower ends thereof and hinged to the base outwardly away from the cover, and leaves confined between said covers and arranged at their lower ends to swing relatively to each other and to the covers, the relative construction and arrangement of the parts being such that if one cover and one or more leaves are swung away from their standing positions, the other cover and leaves will swing oppositely to an open position and when released the covers and leaves will automatically return to their standing closed positions.

3. A leafed device of the character described comprising a base, front and back covers which normally stand upright facing each other above said base and are hingedly connected at their lower ends, a supporting member projecting rearwardly from the back cover and hinged to the base to adapt said back cover to swing to and from its upright position, a fulcrum member hinged to the front cover between the upper and lower ends thereof and hinged to the base forwardly of the cover, and leaves confined between said covers and hinged at their lower ends to swing relatively to each other and to the covers, whereby if the back cover is swung rearwardly from its upright position by pressure on a selected leaf, the front cover and the leaves in front of said selected leaf will swing forwardly and downwardly to an open position.

4. A leafed device of the character described comprising a base, front and back covers which normally stand upright facing each other above said base and are hingedly connected at their lower ends, a supporting member projecting rearwardly from the back cover and hinged to the base to adapt said back cover to swing to and from its upright position, a fulcrum member hinged to the front cover between the upper and lower ends thereof and hinged to the base forwardly of the cover, and leaves confined between said covers and hinged at their lower ends to swing relatively to each other and to the covers, whereby if the back cover is swung rearwardly from its upright position by pressure on a selected leaf, the front cover and the leaves in front of said selected leaf will swing forwardly and downwardly to an open position, the relative construction and arrangement of the parts of the device being such that when the pressure on the back cover is released, the covers and leaves will automatically return to upright closed position.

5. A leafed device of the character described comprising a base, front and back covers which normally stand upright facing each other above said base and are hingedly connected at their lower ends, a leaf holder connected with the lower portion of said back cover, leaves having hinged flaps at their lower ends arranged between said covers with said hinged flaps confined in said holder, a supporting member projecting rearwardly from the back cover and hinged to the base, and a fulcrum member hinged to the front cover between the upper and lower ends thereof and hinged to the base in front of said cover, rearward tilting of the back cover with one or more leaves causing forward downward movement of the front cover and remaining leaves.

6. A leafed device of the character described comprising a base, front and back covers which normally stand upright facing each other above said base and are hingedly connected at their lower ends, a supporting member projecting rearwardly from the back cover and hinged to the base to adapt said back cover to swing to and from its upright position, a fulcrum member hinged to the front cover between the upper and lower ends thereof and hinged to the base forwardly of the cover, a leaf holding receptacle on the underside of said supporting member, and leaves arranged between said covers and having hinged flaps at their lower ends confined in said receptacle, rearward tilting movement of the back cover with one or more leaves causing forward downward movement of the front cover and remaining leaves.

7. A leafed device constructed according to claim 5 in which the hinged flaps of the leaves are loosely confined in said leaf holder, whereby the leaves can be freely removed from and placed in the device when the front cover has been moved forwardly and downwardly.

8. A leafed device constructed according to claim 6, in which the bottom wall of said holding receptacle is capable of a limited downward movement when the covers and leaves are swung away from their upright positions to relieve pressure on the hinged flaps of the leaves.

9. A leafed device of the character described comprising a base, front and back covers which normally stand upright facing each other above said base, a supporting member projecting rearwardly from the lower portion of the back cover and pivoted on the base to adapt the cover to swing to and from its upright position, an open front leaf-holding receptacle on the underside of said supporting member, the bottom wall of which is hinged at its front edge to the lower edge of the front cover, and a fulcrum member hinged to the front cover between the upper and lower ends thereof and hinged to said base forwardly of said cover, whereby rearward swinging movement of the back cover from its upright position will cause the front cover to swing forwardly and downwardly on its hinge connection with said fulcrum member, and leaves arranged between said covers having hinged flaps at their lower ends confined in said receptacle.

10. A leafed device of the character described comprising a base, front and back covers which normally stand upright facing each other above said base and are hingedly connected at their lower ends, a supporting member projecting rearwardly from the back cover and pivoted on the base to adapt the back cover to swing to and from its upright position, a fulcrum member hinged to said front cover between the upper and lower ends thereof and hinged to said base forwardly of the front cover, and leaves arranged between said covers and arranged at their lower ends to swing relatively to each other and to the covers, said leaves having marginal index portions each of which is exposed beyond the edge of the index portion of the next leaf in front thereof, whereby rearward pressure on the index portion of a selected leaf will swing said leaf and any leaves back thereof and the back cover rearwardly and cause the front cover and remaining leaves to swing forwardly and downwardly to open position.

11. A leafed device of the character described comprising a base, front and back covers which normally stand upright facing each other above said base and are hingedly connected at their lower ends, a member projecting rearwardly from the back cover and fulcrumed on a support to adapt said back cover to swing to and from its upright position, a fulcrum member hinged to the front cover between the upper and lower ends thereof and hinged to the base forwardly of the cover, and leaves confined between said covers and hinged at their lower ends to swing relatively to each other and to the covers, whereby if the back cover is swung rearwardly from its upright position by pressure on a selected leaf, the front cover and the leaves in front of said selected leaf will swing forwardly and downwardly to an open position, and power exerting means which automatically closes the covers and leaves when said pressure is released.

12. A leafed device of the character described comprising a base, front and back covers which normally stand upright facing each other above said base and are hingedly connected at their lower ends, a member projecting rearwardly from the back cover and fulcrumed on a support to adapt said back cover to swing to and from its upright position, a fulcrum member hinged to the front cover between the upper and lower ends thereof and hinged to the base forwardly of the cover, and leaves confined between said covers and arranged at their lower ends to swing relatively to each other and to the covers, whereby if the back cover is swung rearwardly from its upright position by pressure on a selected leaf, the front cover and the leaves in front of said selected leaf will swing forwardly and downwardly to an open position, and a spring acting between the base and one of said moving parts to automatically close the covers and leaves when said pressure is released.

GEORGE S. LEWIS.